US008185873B2

(12) United States Patent
Pullara (10) Patent No.: US 8,185,873 B2
(45) Date of Patent: *May 22, 2012

(54) SYSTEM AND METHOD FOR USING A PREPROCESSOR TO DETERMINE DEPENDENCIES BETWEEN J2EE COMPONENTS

(75) Inventor: Sam Pullara, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1203 days.

This patent is subject to a terminal disclaimer.

(21) Appl. No.: 11/950,337

(22) Filed: Dec. 4, 2007

(65) Prior Publication Data

US 2008/0092136 A1   Apr. 17, 2008

Related U.S. Application Data

(63) Continuation of application No. 10/789,012, filed on Feb. 27, 2004, now Pat. No. 7,328,427.

(60) Provisional application No. 60/450,431, filed on Feb. 27, 2003.

(51) Int. Cl.
*G06F 9/44* (2006.01)

(52) U.S. Cl. .......................... 717/121; 717/176; 717/177

(58) Field of Classification Search .................. 717/121, 717/136, 137, 178, 177, 176
See application file for complete search history.

(56) References Cited

U.S. PATENT DOCUMENTS

| | | | |
|---|---|---|---|
| 6,272,556 B1 * | 8/2001 | Gish .............................. | 719/315 |
| 6,636,961 B1 * | 10/2003 | Braun et al. ...................... | 713/1 |
| 6,735,691 B1 * | 5/2004 | Capps et al. ...................... | 713/1 |
| 6,745,250 B1 * | 6/2004 | Cocks et al. ................... | 719/316 |
| 6,751,797 B1 * | 6/2004 | Desgranges et al. .......... | 719/315 |
| 6,938,039 B1 * | 8/2005 | Bober et al. .................. | 707/704 |
| 7,000,238 B2 * | 2/2006 | Nadler et al. ................. | 719/330 |
| 7,065,541 B2 * | 6/2006 | Gupta et al. .......................... | 1/1 |
| 7,080,159 B2 * | 7/2006 | Chu et al. ....................... | 709/246 |
| 7,181,731 B2 * | 2/2007 | Pace et al. ..................... | 717/136 |
| 7,337,435 B2 * | 2/2008 | Bell et al. ...................... | 717/136 |
| 7,379,996 B2 * | 5/2008 | Papatla et al. ................. | 709/224 |
| 7,685,577 B2 * | 3/2010 | Pace et al. ..................... | 717/136 |
| 2003/0188036 A1 | 10/2003 | Chen et al. | |
| 2003/0192028 A1 * | 10/2003 | Gusler et al. ................. | 717/101 |

(Continued)

FOREIGN PATENT DOCUMENTS

CA    2323689    12/2001

OTHER PUBLICATIONS

Moore et al., "Migrating WebLogic Applications to WebSphere Advanced Edition V4", Jul. 2002, IBM.*

(Continued)

*Primary Examiner* — Phillip Nguyen
(74) *Attorney, Agent, or Firm* — Fliesler Meyer LLP (57) ABSTRACT

A system and method for using a preprocessor to determine dependencies between J2EE components. The preprocessor can analyze a running J2EE application, and look at the deployment descriptor information associated with that application. The levels of indirection within the deployed application are followed to determine the actual configuration information used to deploy the application on a first application server. This configuration information can then be parsed, communicated, or otherwise output to a system administrator or software developer, or in some embodiments directly to a second application server, and used to deploy the application on that second application server.

18 Claims, 5 Drawing Sheets

U.S. PATENT DOCUMENTS

2004/0158820 A1\* 8/2004 Moore et al. .................. 717/136
2004/0205732 A1\* 10/2004 Parkinson ..................... 717/137

OTHER PUBLICATIONS

Rolia et al., "Service Centric Computing—Next Generation Internet Computing", 2002, Springer, pp. 463-479.\*

Lerner, "At the Forge: Enterprise JavaBeans", 2001.\*

Frenot et al., "EJB Components Migration Service and Automatic Deployment", 2002.\*

Moore et al., "Migrating WebLogic Applications to WebSphere V5", Jan. 2003.\*

\* cited by examiner

Application Side

- Define Application (EJB) to Depend on One or More Data Sources (DS)

- Deploy EJB to a (J2EE) Server, e.g. Weblogic, Websphere, etc.

- Server Makes Connection From Data Source (DS) to JNDI Name (e.g. com.bea.ds.oracle)

- Connection is Kept in the Deployed EJB

Server Side

- Provide Management APIs Inside Server

- Define Data Sources (DS) with Respect to Connector Pools, JMS Queues, etc.

- Provide/Associate Data Source with a JNDI Name That It Will Be Bound To

- Associate Data Source With Connection Pool

SYSTEM AND METHOD FOR USING A PREPROCESSOR TO DETERMINE DEPENDENCIES BETWEEN J2EE COMPONENTS

CLAIM OF PRIORITY

This application is a continuation of U.S. patent application Ser. No. 10/789,012 filed Feb. 27, 2004, entitled "SYSTEM AND METHOD FOR USING A PREPROCESSOR TO DETERMINE DEPENDENCIES BETWEEN J2EE COMPONENTS" which claims priority to U.S. Provisional Patent Application 60/450,431, filed Feb. 27, 2003, entitled "SYSTEM AND METHOD FOR USING A PREPROCESSOR TO DETERMINE DEPENDENCIES BETWEEN J2EE COMPONENTS."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and J2EE servers, and particularly to a system and method for using a preprocessor to determine dependencies between J2EE components.

BACKGROUND

The JAVA 2 Enterprise Edition (J2EE) platform is often used to build distributed transactional applications for the enterprise. To allow for rapid application design, the J2EE platform provides a component-based approach to the design, development, assembly and deployment of enterprise applications. The J2EE platform offers a multi-tiered distributed application model, and the ability to reuse components. In a multi-tiered distributed application model, application logic is divided into components according to their function and the components are often themselves physically divided onto separate machines depending on their association to a certain J2EE environment tier. Communication for the purpose of coordination between physically and logically distinct components of an enterprise application is therefore often complex.

A common problem with application servers is that, when moving applications from one server to another, either between servers of similar type/manufacture, or between servers of different type, the application configuration information must be duplicated in some manner on the destination server. This is usually a tedious and time-consuming process requiring the expert skills of an application developer or administrator. The process is also prone to error since it usually requires the developer to visually inspect large textual configuration files, and make necessary changes to configure the application for its new environment. Tools that can help the developer in this task would be very useful, would minimize the amount of time required to migrate the application from one server to another, and would promote the feasibility of moving applications from one server, or server product, to another.

SUMMARY

The invention provides a system and method for using a preprocessor to determine dependencies between J2EE components. The preprocessor can analyze a running J2EE application, and look at the deployment descriptor information associated with that application. The levels of indirection within the deployed application are followed to determine the actual configuration information used to deploy the application on a first application server. This configuration information can then be parsed, communicated, or otherwise output to a system administrator or software developer, or in some embodiments directly to a second application server, and used to deploy the application on that second application server.

DETAILED DESCRIPTION

As disclosed herein, an embodiment of the invention provides a system and method for using a preprocessor to determine dependencies between J2EE components. Generally described, an embodiment of the invention allows a system, such as an application server, or process running thereon, to analyze a running J2EE application, and to look at the deployment descriptor information associated with that application. In one embodiment the invention is provided in the form of a system that includes a preprocessor-type mechanism. The system/preprocessor follows the levels of indirection within the deployed application to determine the actual configuration information used to deploy the application on a first application server. This configuration information can then be parsed, communicated, or otherwise output to a system administrator or software developer, or in some embodiments directly to a second application server, and used to deploy the application on that second application server.

So, for example, if an application deployed on a first server specifies that it needs a particular data source in order to operate properly, at runtime the preprocessor determines that the application needs that data source, and further determines what that data source might be. The preprocessor then check the global configuration information to locate a data source that matches the one specified by the application, and then retrieves both that particular data source configuration information and any configuration information which that data source may depend on. This configuration information is then used to assist in repackaging all of the applications' dependency-based deployment information, for successfully deploying the application on another (second) server. In the context of this invention, the first and second server can be any application server, and particularly any J2EE-compatible server, including BEA's WebLogic system, IBM Websphere, or any equivalent application server product. The invention is designed to assist in the process of moving applications both between servers of the same type (i.e. between a first WebLogic server and a second WebLogic server), and between servers of different types (i.e. between a WebLogic server and a Websphere server).

Figure 1:
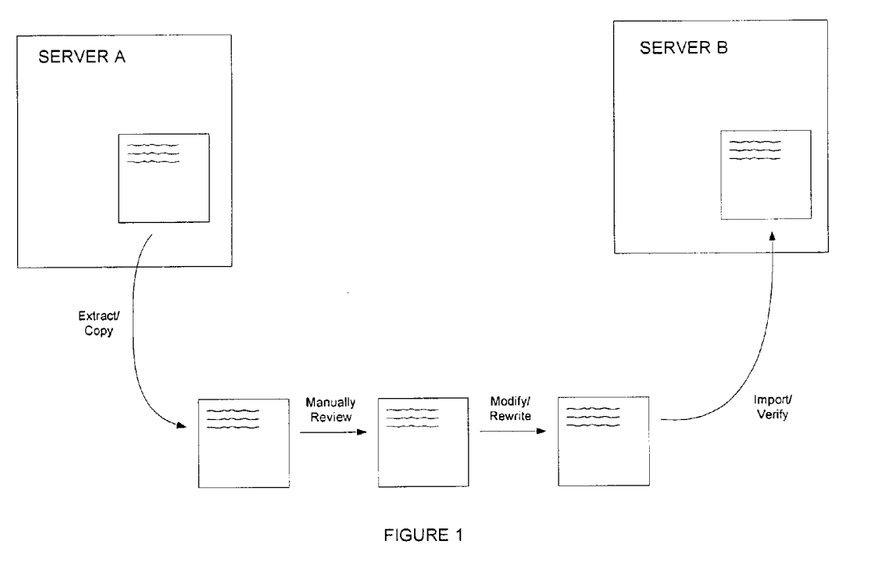
FIG. 1 shows an illustration of a manual application configuration mechanism for an application being moved or copied from a first server to a second server.

FIG. 1 shows an illustration of a manual application configuration mechanism for an application being moved or copied from a first server to a second server. As shown in FIG. 1, the traditional process is quite time-consuming, involving numerous steps. It requires the administrator, developer, or other person responsible for deploying applications, to first extract or copy the application deployment information from the first server. This configuration information must be reviewed by an experienced developer to determine any problems or dependencies that may need to be addressed prior to installing the application on the second server. References to data sources may need to be manually checked and edited to conform to the data sources on the destination machine. If the reviewer fails to locate all dependencies on data sources then the application may not work as intended. Once the information has been reviewed and edited, the configuration information is used to configure the second server. This step is often a cut-and-paste or data entry task, which is again time-consuming, and prone to error.

Figure 2:
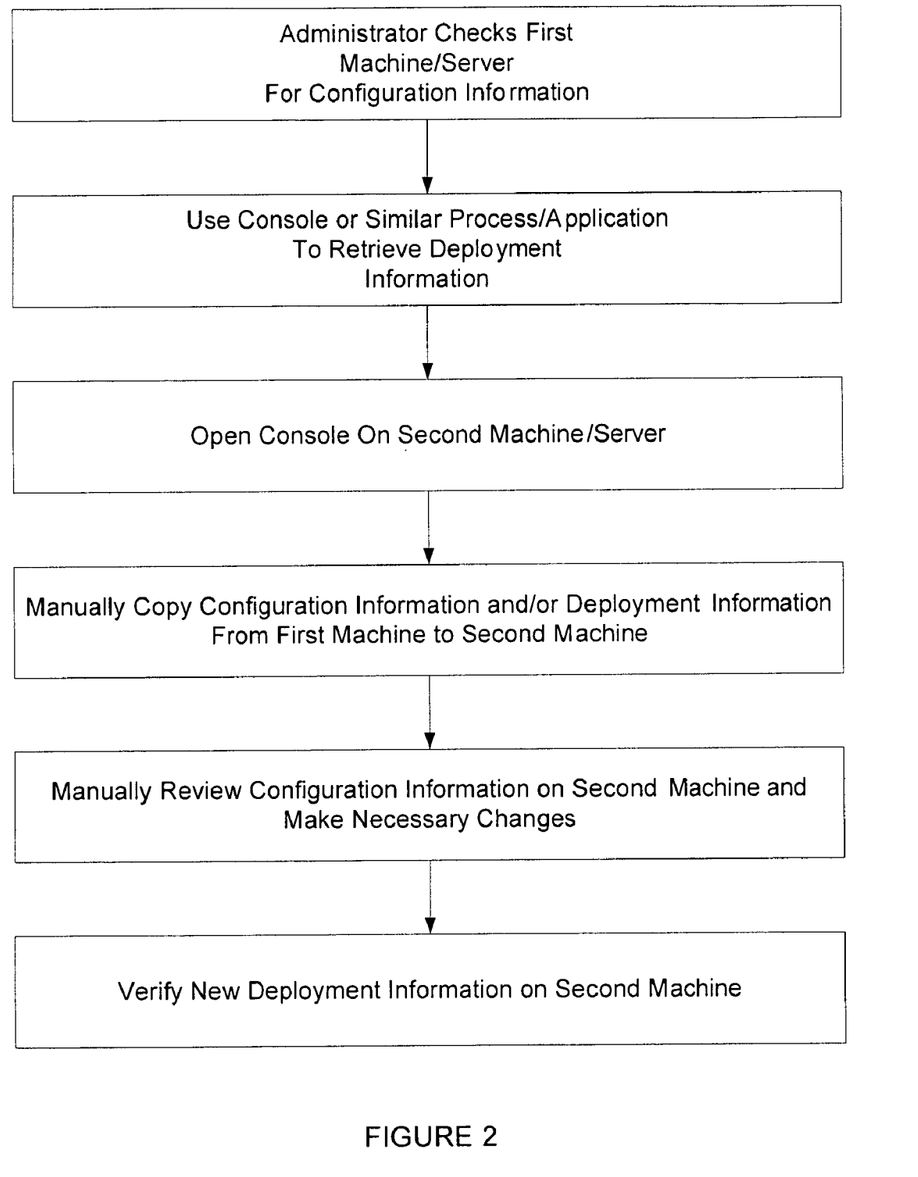
FIG. 2 shows a flowchart of a manual application configuration process.

FIG. 2 shows a flowchart of a manual application configuration process. As can be seen from FIG. 2, the administrator initially checks the first (source) server for the appropriate application configuration information. An administrative console application, or similar interface is then used to manually retrieve the deployment information for the desired application. The administrator typically then opens a console application or similar interface on the second (destination) server. Application deployment configuration information is manually copied from the first server to the second server. The administrator must then review the text entries, and use their expertise to check for any dependencies, which would need to be addressed by further investigation and copying. The configuration information must then be revised to match the environment on the second server.

Figure 3:
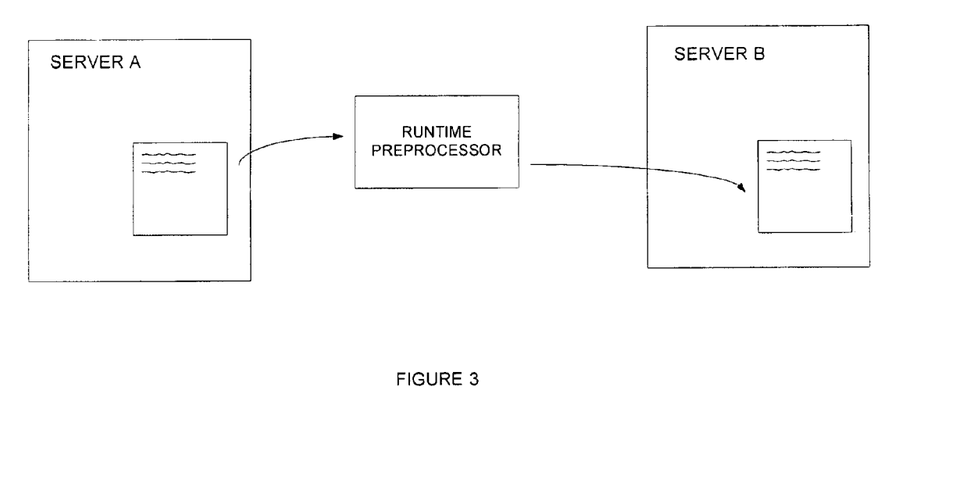
FIG. 3 shows an illustration of a system which uses a preprocessor to determine dependencies between J2EE components, in accordance with an embodiment of the invention.

FIG. 3 shows an illustration of a system which uses a preprocessor to determine dependencies between J2EE components, in accordance with an embodiment of the invention. As shown in FIG. 3, the deployment configuration is communicated from a first server to a second server by means of a preprocessor. Although shown in FIG. 3 as a separate logical entity, the preprocessor can be included with the first or second server, to better assist in moving applications to or from that server. Following deployment of the application on the first server, the preprocessor can be used to interrogate the deployment information and any dependencies included therein, and to communicate a subset of that information to the second server for use in deploying the application there. This communication may be automatic, or may include sending the information to an administrator for use by them in deploying the application.

Figure 4:
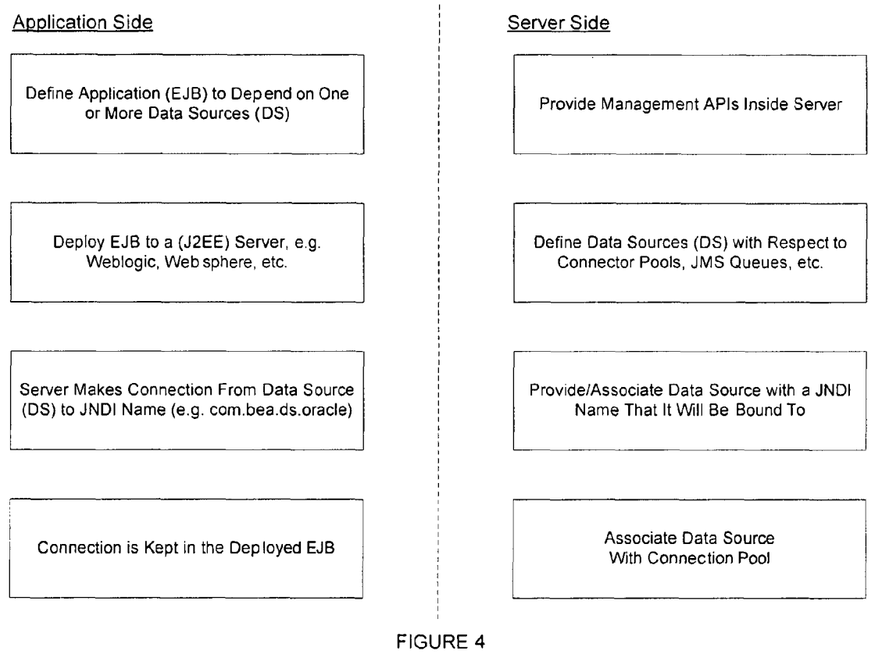
FIG. 4 shows an illustration of the server-side, and application-side features used by the preprocessor, in accordance with an embodiment of the invention.

FIG. 4 shows an illustration of the server-side, and application-side features used by the preprocessor, in accordance with an embodiment of the invention. As shown in FIG. 4, an application can be considered to have two sides—an application side and a server side. On the application side, a software developer must define the application (for example an EJB) to depend on one or more data sources (DS). During normal use the application is then deployed on an application server (in this instance any J2EE server, for example WebLogic). For that application, during deployment the server will make a connection from the data source to a Java Naming and Directory Interface (JNDI) name (for example com.bea.ds.oracle). This connection is then kept with the deployed Enterprise Java Beans (EJB).

On the server side, the server must provide the management Application Programming Interfaces (APIs) inside the server for use by the application. Data sources (DS) used by the server are defined with respect to connector pools, Java Messaging Service (JMS) queues, etc. The server must provide, or associate, each data source with a JNDI name with which that data source will be bound. The data source is then associated with a connection pool.

During the action of the preprocessor, the data source commonalities between the application side and the server side for the deployed application are interrogated and are used to provide application deployment configuration information, which can then be used to deploy the application on a second server, with appropriate dependencies. For example, the system can determine a particular data source. It will then determine that a particular EJB depends on that data source. It then determines that the data source depends by name on a particular connection pool, etc. This configuration information is output to a file, or communicated directly to the destination server.

Figure 5:
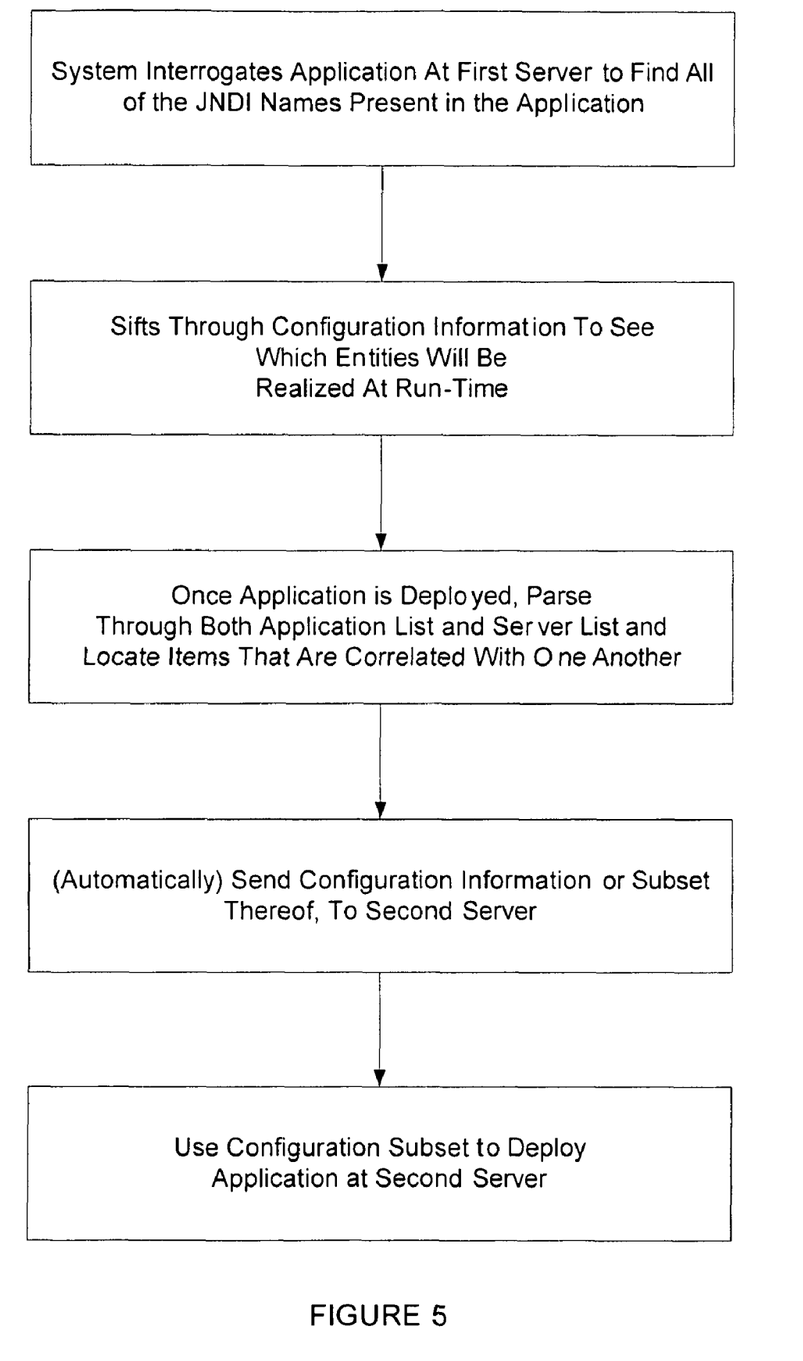
FIG. 5 shows a flowchart of a process which uses a preprocessor to determine dependencies between J2EE components, in accordance with an embodiment of the invention.

FIG. 5 shows a flowchart of a process which uses a preprocessor to determine dependencies between J2EE components, in accordance with an embodiment of the invention. As shown in FIG. 5, the system first interrogates the deployed application at a first server to find all JNDI names present in the application. This configuration information is sifted to see which entities will be realized at runtime. Once the application is deployed on the first server, the system can parse through both the application-side list, and the server-side list, and located those dependencies that correlate with one another. This configuration information is then either automatically sent to the second server, or is output to a file (in one embodiment a config.xml file) for use by the administrator in deploying the application on the second server. In other embodiments the information can be used to support a Web or graphical interface that allows an administrator to point-and-click to move applications from one server to another, to retrieve configuration information, and to deploy applications on a destination server. When the application is finally deployed on the second server, the administrator must typically make some minor adjustments to ensure that, e.g. the database names, and passwords, etc. specified by the application match those at the second server.

Code Implementation

The following code segments illustrate, by way of example, how the configuration information may be specified, and how the preprocessor may operate in accordance with one embodiment of the invention. It will be evident that additional implementations may be developed within the spirit and scope of the invention, and that the invention is not limited to the examples shown.

Configuration Information
<Config>
    <JDBCConnectionPool CapacityIncrement="1"

-continued

```
            DriverName="oracle.jdbc.driver.OracleDriver" InitialCapacity="1"
            LoginDelaySeconds="5" MaxCapacity="20" Name="ebayPool0"
Properties="user=system;password=manager;dll=ocijdbc8;protocol=thin"
            RefreshMinutes="15" Targets="myserver" TestTableName="dual"
URL="jdbc:oracle:thin:@paradise:1521:para816"/>
        <JDBCTxDataSource EnableTwoPhaseCommit="false" JNDIName="ebay_ds0"
            Name="ebay_ds0" PoolName="ebayPool0" Targets="myserver"/>
</Config>
Generate Config JSP
<%@ page contentType="text/xml" %><%@
    page errorPage="/error.jsp" %><%@
        page import=            "weblogic.management.*,
                                 weblogic.apache.xml.serialize.*,
                                 javax.management.*,
                                 weblogic.management.internal.xml.*,
                                 weblogic.management.configuration.*,
                                 weblogic.management.descriptors.*,
                                 weblogic.management.descriptors.toplevel.*,
                                 weblogic.management.descriptors.weblogic.*,
                                 weblogic.management.descriptors.webappext.*,
                    weblogic.management.descriptors.webappext.ReferenceDescriptorMBean,
                    weblogic.management.descriptors.webappext.ResourceDescriptionMBean,
                                 javax.naming.*,
                                 javax.xml.parsers.*,
                                 org.w3c.dom.*"
%><%         MBeanHome  home  =  (MBeanHome)new
InitialContext( ).lookup(MBeanHome.ADMIN_JNDI_NAME);
         ApplicationMBean  app  =  (ApplicationMBean)  home.getMBean(new
WebLogicObjectName(request.getParameter("name")));
    ComponentMBean[] components = app.getComponents( );
    List jndiNames = new ArrayList( );
    for (int i = 0; i < components.length; i++) {
        if (components[i] instanceof WebAppComponentMBean) {
            WebAppComponentMBean webApp = (WebAppComponentMBean) components[i];
                    WebDescriptorMBean  webDescriptor  =  (WebDescriptorMBean)
webApp.findOrCreateWebDescriptor( );
            if (webDescriptor != null) {
                                    WebAppExtDescriptorMBean  webAppDescriptor  =
webDescriptor.getWebAppExtDescriptor( );
                if (webAppDescriptor != null) {
                                        ReferenceDescriptorMBean  refDescriptor  =
webAppDescriptor.getReferenceDescriptor( );
                    if (refDescriptor != null) {
                                    ResourceDescriptionMBean[]  resourceDescriptions  =
refDescriptor.getResourceReferences( );
                            for  (int  j  =  0;  resourceDescriptions  !=  null  &&  j  <
resourceDescriptions.length; j++) {
                                    ResourceDescriptionMBean  resourceDescription  =
resourceDescriptions[j];
                    jndiNames.add(resourceDescription.getJndiName( ));
                        }
                    }
                }
            }
        } else if (components[i] instanceof EJBComponentMBean) {
            EJBComponentMBean ejb = (EJBComponentMBean) components[i];
            EJBDescriptorMBean ejbDescriptor = ejb.findOrCreateEJBDescriptor( );
            if (ejbDescriptor != null) {
                WeblogicEJBJarMBean wlEJBJar = ejbDescriptor.getWeblogicEJBJarMBean( );
                if (wlEJBJar != null) {
                                        WeblogicEnterpriseBeanMBean[]  wejbs  =
wlEJBJar.getWeblogicEnterpriseBeans( );
                    for (int j = 0; wejbs != null && j < wejbs.length; j++) {
                            weblogic.management.descriptors.weblogic.ReferenceDescriptorMBean
refDescriptor = wejbs[j].getReferenceDescriptor( );
                        if (refDescriptor != null) {
                            weblogic.management.descriptors.weblogic.ResourceDescriptionMBean[]
resourceDescriptions = refDescriptor.getResourceDescriptions( );
                            for  (int  k  =  0;  resourceDescriptions  !=  null  &&  k  <
resourceDescriptions.length; k++) {
                                weblogic.management.descriptors.weblogic.ResourceDescriptionMBean
resourceDescription = resourceDescriptions[k];
                                jndiNames.add(resourceDescription.getJNDIName( ));
                            }
                        }
                    }
                }
            }
        }
    }
```

```
        }
        DocumentBuilderFactory dbf = DocumentBuilderFactory.newInstance( );
        DocumentBuilder db = dbf.newDocumentBuilder( );
        Document appConfig = db.newDocument( );
        Element root = appConfig.createElement("ApplicationConfig");
        appConfig.appendChild(root);
        ConfigurationGenerator cg = new ConfigurationGenerator( );
            Document  domainConfig  =  (Document)  cg.getXml(home.getMBeanServer( ),
home.getActiveDomain( ).getName( ));
        Node top = domainConfig.getElementsByTagName("Domain").item(0);
        matchChildren(top, top, root, appConfig, jndiNames);
        OutputFormat format = new OutputFormat("XML", "UTF-8", true);
        XMLSerializer serializer = new XMLSerializer(out, format);
        serializer.serialize(appConfig);
%><%!
    private void matchChildren(Node domain, Node top, Node root, Document appConfig,
List jndiNames) {
        NodeList mbeansList = top.getChildNodes( );
        for (int i = 0; i < mbeansList.getLength( ); i++) {
            Node mbeanNode = mbeansList.item(i);
            NamedNodeMap attributes = mbeanNode.getAttributes( );
            if (attributes != null) {
                Node jndiNameNode = attributes.getNamedItem("JNDIName");
                if (jndiNameNode != null) {
                    String jndiName = jndiNameNode.getNodeValue( );
                    if (jndiNames.contains(jndiName)) {
                        if (mbeanNode.getParentNode( ) == domain) {
                            Node newNode = appConfig.importNode(mbeanNode, true);
                            newNode.getAttributes( ).removeNamedItem("Targets");
                            root.appendChild(newNode);
                        } else {
                            while(mbeanNode.getParentNode( ) != domain) {
                                mbeanNode = mbeanNode.getParentNode( );
                            }
                            Node newNode = appConfig.importNode(mbeanNode, true);
                            newNode.getAttributes( ).removeNamedItem("Targets");
                            root.appendChild(newNode);
                            return;
                        }
                    }
                }
            }
            matchChildren(domain, mbeanNode, root, appConfig, jndiNames);
        }
    }
%>
User Batched Test Bean
package com.sampullara.mdb;
import javax.ejb.*;
import javax.jms.*;
import javax.naming.InitialContext;
import javax.naming.NamingException;
import javax.transaction.*;
import weblogic.jms.extensions.*;
import weblogic.ejb20.internal.jms.*;
import java.lang.reflect.Method;
/**
 * @ejbgen:message-driven
 *       destination-jndi-name = jms.userbatchedqueue
 *       ejb-name = UserBatchedTest
 *       transaction-type = Bean
 *
 * @ejbgen:env-entry
 *       name = weblogic.ejb.mdb.batchsize
 *       type = java.lang.Integer
 *       value = 200
 *
 */
public class UserBatchedTestBean extends TestBean implements MessageListener,
Status {
    private int txCount = 0;
    private UserTransaction tx;
    private int batchSize = 0;
    public void ejbCreate( ) throws CreateException {
        try {
            Object batchSizeObject = getEnvEntry("weblogic.ejb.mdb.batchsize");
            batchSize = ((Integer) batchSizeObject).intValue( );
            if (batchSize <= 0) {
                throw new CreateException("weblogic.jms.mdb.batchsize must be a positive
integer ( > 0 ), 1 is the default");
```

```
            }
        } catch (EJBException ejbe) {
            batchSize = 1;
        } catch (ClassCastException cce) {
                throw new CreateException("weblogic.jms.mdb.batchsize must have type
java.lang.Integer instead of " +
getEnvEntry("weblogic.jms.mdb.batchsize").getClass( ).getName( ));
        }
        try {
                                                tx  =  (UserTransaction)
getInitialContext( ).lookup("javax.transaction.UserTransaction");
        } catch (NamingException ne) {
                throw new CreateException("Could not find the transaction manager
(javax.transaction.UserTransaction) in JNDI");
        }
        System.out.println("Batch size: " + batchSize);
    }
    public void onMessage(Message message) {
        try {
            switch (tx.getStatus( )) {
            case STATUS_ACTIVE:
                // Commit any messages that are already in process before trying the
redelivered message
                if(!commitIfRedelivered(message)) {
                    break;
                }
            case STATUS_NO_TRANSACTION:
            case STATUS_COMMITTED:
            case STATUS_ROLLEDBACK:
                // We understand the transaction state in these cases
                try {
                    tx.begin( );
                    System.out.println("New transaction");
                } catch (NotSupportedException nse) {
                    nse.printStackTrace( );
                    throw new BatchedMessageException("We are trying to nest transactions but
the code doesn't nest transactions", nse);
                }
                txCount = 0;
                break;
            default:
                // We don't understand the transaction state so we exit abruptly.
                System.out.println(tx.getStatus( ));
                throw new BatchedMessageException("Inconsistent transaction state, cannot
continue processing messages: " + tx.getStatus( ));
            }
        } catch (SystemException se) {
            se.printStackTrace( );
          throw new BatchedMessageException("Could not find the transaction in JNDI",
se);
        }
        txCount++;
        try {
            QueueSessionImpl sessionImpl = (QueueSessionImpl) getSession( );
            Method method = SessionImpl.class.getDeclaredMethod("getSession", new Class[]
{ });
            method.setAccessible(true);
                MDBTransaction session = (MDBTransaction) method.invoke(sessionImpl, new
[] {});
            session.associateTransaction(message);
        } catch (JMSException jmse) {
            jmse.printStackTrace( );
            throw new BatchedMessageException("Could not associate transaction with
message", jmse);
        } catch (ClassCastException cce) {
            cce.printStackTrace( );
                throw new BatchedMessageException("The container has the wrong kind of
sessions: " + getSession( ).getClass( ).getName( ), cce);
        } catch (Exception e) {
            e.printStackTrace( );
            throw new BatchedMessageException("Problem getting the session", e);
        }
        // We've started the transaction, now call the onMessage
        onMessageBatched(message);
        // If we have reached the batchsize, commit.
        if (!commitIfRedelivered(message)) {
            if (txCount == batchSize) {
                try {
                    System.out.println("commit");
                    tx.commit( );
```

```
            } catch (Exception e) {
                e.printStackTrace( );
                // Failure means we need these messages redelivered
                    throw new BatchedMessageException("Could not process message: " +
message, e);
            } finally {
                txCount = 0;
            }
        }
    }
}
    private boolean commitIfRedelivered(Message message) {
        // If this is a redelivered message then we commit immediately
        try {
            if (message.getJMSRedelivered( )) {
                try {
                    tx.commit( );
                    return true;
                } catch (Exception e) {
                    // Failure means we need these messages redelivered
                    e.printStackTrace( );
                    throw new BatchedMessageException("Could not commit messages", e);
                } finally {
                    txCount = 0;
                }
            }
        } catch (JMSException jmse) {
            throw new BatchedMessageException("JMS failed to retrieve redelivery flag"
, jmse);
        }
        return false;
    }
    public void onMessageBatched(Message message) {
        super.onMessage(message);
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, servers, and computing environments, may use and benefit from the invention. The code example given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system to migrate a software application from a first application server to another application server, comprising:
    a computer including a microprocessor;
    the first application server, executing on the computer, that includes an application deployed thereon as a deployed application, wherein the deployed application includes both application-side and server-side data source components; and
    a preprocessor server component on the first application server that used to
        interrogate, by successively locating components specified by the deployed application and retrieving configuration information for those components and for dependent components, configuration of the deployed application including commonalities between its application-side and server-side data source components, its deployment descriptor, and any dependencies included therein,
        use the configuration information for those components and for dependent components reflecting the configuration of the deployed application to generate an application deployment configuration information, and
        communicate the application deployment configuration information to the another application server that is used in deploying the deployed application at the another application server.

2. The system of claim 1 wherein the application deployment configuration information is saved to a configuration file for subsequent use in deployment of the application at the second application server.

3. The system of claim 1 wherein the system further comprises a graphical user interface or web interface that allows the developer to select an application at the first application server for subsequent deployment at the second application server.

4. A method for migrating a software application from one software application server to a different software application server, comprising the steps of:
 providing a first application server that includes a preprocessor and an application deployed thereon as a deployed application, wherein the deployed application includes both application-side and server-side data source components; and
 using the preprocessor to
  interrogate, by successively locating components specified by the deployed application and retrieving configuration for those components and for dependent components, configuration of the deployed application including commonalities between its application-side and server-side data source components, its deployment descriptor, and any dependencies included therein,
  use the configuration information for those components and for dependent components reflecting the configuration of the deployed application to generate an application deployment configuration information, and to communicate the application deployment configuration information to a second application server that is used in deploying the deployed application at the second application server.

5. The method of claim 4 wherein the application deployment configuration information is saved to a configuration file for subsequent use in deployment of the application at the second application server.

6. The method of claim 4 wherein the system further comprises a graphical user interface or web interface that allows the developer to select an application at the first application server for subsequent deployment at the second application server.

7. A non-transitory computer readable medium including instructions stored thereon which when executed cause the computer to perform the steps of:
 providing a first application server that includes an application deployed thereon as a deployed application, wherein the deployed application includes both application-side and server-side data source components, and a preprocessor; and
 interrogating, by successively locating components specified by the deployed application and retrieving configuration information for those components and for dependent components, configuration of the deployed application including commonalities between its application-side and server-side data source components, its deployment descriptor, and any dependencies included therein using the preprocessor;
 using the configuration information for those components and for dependent components reflecting the configuration of the deployed application in generating an application deployment configuration information; and
 communicating the application deployment configuration information to a second application server that is used in deploying the deployed application at the second application server.

8. The non-transitory computer readable medium of claim 7 wherein the application deployment configuration information is saved to a configuration file for subsequent use in deployment of the application at the second application server.

9. The non-transitory computer readable medium of claim 7 wherein the system further comprises a graphical user interface or web interface that allows the developer to select an application at the first application server for subsequent deployment at the second application server.

10. A system for readily deploying software applications from a first server to a second server, comprising:
 a computer including a microprocessor;
 the first server, executing on the computer, having an application deployed thereon as a deployed application, wherein the deployed application includes both application-side and server-side data source components;
 the second server that receives said application; and
 a preprocessor on said first server that interrogates, by successively locating components specified by the deployed application and retrieving configuration information for those components and for dependent components, configuration of the deployed application including commonalities between its application-side and server-side data source components, its deployment descriptor, and any dependencies included therein, and uses the configuration information for those components and for dependent components reflecting the configuration of the deployed application to generate an application deployment configuration information and communicates the application deployment configuration information, that is used in deploying the deployed application at said second server.

11. The system of claim 10 wherein the application deployment configuration information is saved to a configuration file for subsequent use in deployment of the application at the second server.

12. The system of claim 10 wherein the system further comprises a graphical user interface or web interface that allows the developer to select an application at the first server for subsequent deployment at the second server.

13. A method for readily deploying software applications from a first server to a second server, comprising the steps of:
 providing the first server having an application deployed thereon as a deployed application, wherein the deployed application includes both application-side and server-side data source components, and a preprocessor;
 providing the second server the receives said application; and
 interrogating, by successively locating components specified by the deployed application and retrieving configuration information for those components and for dependent components, configuration of the deployed application including commonalities between its application-side and server-side data source components, its deployment descriptor, and any dependencies included therein using the preprocessor, and using the configuration information for those components and for dependent components reflecting the configuration of the deployed application in generating an application deployment configuration information and communicating the application deployment configuration information, that is used in deploying the application at said second server.

14. The method of claim 13 wherein the application deployment configuration information is saved to a configuration file for subsequent use in deployment of the application at the second server.

15. The method of claim 13 wherein the system further comprises a graphical user interface or web interface that allows the developer to select an application at the first server for subsequent deployment at the second server.

16. A non-transitory computer readable medium including instructions stored thereon which when executed cause the computer to perform the steps of:

providing a first server having an application deployed thereon as a deployed application, wherein the deployed application includes both application-side and server-side data source components, and a preprocessor;

providing a second server that receives said application; and interrogating, by successively locating components specified by the deployed application and retrieving configuration information for those components and for dependent components, configuration of the deployed application including commonalities between its application-side and server-side data source components, its deployment descriptor, and any dependencies included therein using the preprocessor, and using the configuration information for those components and for dependent components reflecting the configuration of the deployed application in generating an application deployment configuration information and communicating the application deployment configuration information, that is used in deploying the application at said second server.

17. The non-transitory computer readable medium of claim 16 wherein the application deployment configuration information is saved to a configuration file for subsequent use in deployment of the application at the second server.

18. The non-transitory computer readable medium of claim 16 wherein the system further comprises a graphical user interface or web interface that allows the developer to select an application at the first server for subsequent deployment at the second server.

* * * * *

UNITED STATES PATENT AND TRADEMARK OFFICE
CERTIFICATE OF CORRECTION

PATENT NO. : 8,185,873 B2
APPLICATION NO. : 11/950337
DATED : May 22, 2012
INVENTOR(S) : Pullara It is certified that error appears in the above-identified patent and that said Letters Patent is hereby corrected as shown below:

In column 3, line 25-26, delete "time-consuming." and insert -- time-consuming --, therefor.

In column 9-10, line 24, delete "if(!commitIfRedelivered(message))" and insert
-- if (!commitIfRedelivered(message)) --, therefor.

In column 9-10, line 59, delete "[] { });" and insert -- Object [] { }); --, therefor.

In column 11, line 35, below "(message);" insert -- } --.

In column 14, line 47, in Claim 13, delete "server the" and insert -- server that --, therefor.

Signed and Sealed this
Twenty-eighth Day of August, 2012

David J. Kappos
*Director of the United States Patent and Trademark Office*